United States Patent
Cooper et al.

(10) Patent No.: US 7,182,252 B1
(45) Date of Patent: *Feb. 27, 2007

(54) METHODS AND SYSTEMS FOR TRANSFERRING FUNDS

(75) Inventors: Wayne P. Cooper, Charlotte, NC (US);
Patrick C. Brown, Charlotte, NC (US);
Clyde Dennis Jones, Cornelius, NC (US)

(73) Assignee: Telecommusa, Ltd., Charlotte, NC (US)

( * ) Notice: Subject to any disclaimer, the term of this patent is extended or adjusted under 35 U.S.C. 154(b) by 184 days.

This patent is subject to a terminal disclaimer.

(21) Appl. No.: 10/747,507

(22) Filed: Dec. 29, 2003

Related U.S. Application Data (63) Continuation-in-part of application No. 09/877,533, filed on Jun. 8, 2001, now Pat. No. 6,736,314.

(51) Int. Cl.
G06F 19/00 (2006.01)
G06F 17/00 (2006.01)
G06Q 20/00 (2006.01)
G06Q 40/00 (2006.01)

(52) U.S. Cl. .................. 235/379; 235/375; 705/17; 705/39

(58) Field of Classification Search ............. 235/375, 235/379, 380, 17, 39, 41; 705/17, 38, 39, 705/41
See application file for complete search history.

(56) References Cited

U.S. PATENT DOCUMENTS

| | | | |
|---|---|---|---|
| 4,408,203 A | 10/1983 | Campbell | |
| 4,423,316 A | 12/1983 | Sano et al. | |
| 4,988,849 A | 1/1991 | Sasaki et al. | |
| 5,122,950 A | 6/1992 | Benton et al. | |
| 5,265,008 A | 11/1993 | Benton et al. | |
| 5,283,829 A | 2/1994 | Anderson | |
| 5,326,960 A | 7/1994 | Tannenbaum | |
| 5,343,529 A | 8/1994 | Goldfine et al. | |
| 5,350,906 A | 9/1994 | Brody et al. | |
| 5,371,797 A | 12/1994 | Bocinsky, Jr. | |
| 5,448,043 A | 9/1995 | Nakano et al. | |
| 5,455,407 A | 10/1995 | Rosen | |
| 5,457,305 A | 10/1995 | Akel et al. | |
| 5,461,217 A | 10/1995 | Claus | |
| 5,465,206 A | 11/1995 | Hilt et al. | |
| 5,650,604 A | 7/1997 | Marcous et al. | |
| 5,659,165 A | 8/1997 | Jennings et al. | |
| 5,825,003 A | 10/1998 | Jennings et al. | |
| 5,937,396 A | 8/1999 | Konya | |

(Continued)

OTHER PUBLICATIONS

Rapid Money; Various pages from www.rapidmoney.com with a total of 9 pages.
Western Union Application with a total of 3 pages.

*Primary Examiner*—Thien M. Le
*Assistant Examiner*—April A. Taylor
(74) *Attorney, Agent, or Firm*—Alston & Bird LLP (57) ABSTRACT

Methods and systems for transferring funds are disclosed that utilize a transfer card issued to a sender that enables the sender to transfer funds at independent host locations. The transfer card may be encoded with information about the sender and the intended receiver so that transfer forms are not required for each transaction. The receiver obtains the funds via a distribution center, wherein the personal identity of the receiver is verified before the funds are distributed.

48 Claims, 4 Drawing Sheets

U.S. PATENT DOCUMENTS

| | | |
|---|---|---|
| 5,963,647 A | 10/1999 | Downing et al. |
| 6,012,048 A | 1/2000 | Gustin et al. |
| 6,488,203 B1 * | 12/2002 | Stoutenburg et al. ....... 235/379 |
| 6,736,314 B2 * | 5/2004 | Cooper et al. .............. 235/380 |
| 6,814,282 B2 * | 11/2004 | Seifert et al. ............... 235/379 |
| 2002/0016763 A1 * | 2/2002 | March ........................ 705/39 |
| 2002/0195486 A1 * | 12/2002 | Erb et al. ................... 235/379 |
| 2003/0024979 A1 * | 2/2003 | Hansen et al. .............. 235/379 |

* cited by examiner

METHODS AND SYSTEMS FOR TRANSFERRING FUNDS

CROSS-REFERENCE TO RELATED APPLICATIONS

This application is a continuation-in-part of U.S. application Ser. No. 09/877,533, filed Jun. 8, 2001, now U.S. Pat. No. 6,736,314 entitled "Methods and Systems For Transferring Funds."

FIELD OF THE INVENTION

The present invention is generally related to the electronic transfer of funds and, more particularly, directed to methods and systems for transferring funds using an existing independent or third party host system to effect funds transfer.

BACKGROUND OF THE INVENTION

The concept of transferring funds or "wiring money" has been practiced for over a century. At today's speed of society, there is a greater and greater need for transferring funds rapidly from one individual to another. Wiring money is particularly useful for individuals that are known as "unbanked," which means unaffiliated with a financial institution. Migrant workers or foreign nationals, for example, are often unbanked and frequently use wire transfers to send money to other states or other countries for a variety of reasons. For example, these individuals rely on money transfers to help support their families or provide medical or other expenses to those located elsewhere. There are several conventional methods of transferring or wiring money, the most common being a transfer service by Western Union®.

To send money via Western Union®, a customer must travel to Western Union® office or agent location and present case or equivalent funds in the amount to be transferred plus a service fee. The sender is required to fill out a detailed transfer request form for each transaction, which is then automatically or manually entered into the Western Union® system. This is a very labor intensive and time-consuming operation, particularly if the sender makes frequent transfers.

Another system of transferring funds allows customers of a particular financial institution to transfer and receive funds between other account holders electronically. However, this system requires that the individuals have accounts at the financial institution or affiliated institutions, and therefore ignores the large number of unbanked customers that wish to transfer funds.

Yet another system of transferring funds is disclosed in U.S. Pat. No. 5,650,604, which discloses a system and method for transferring funds using automated teller machines ("ATM") such that the identity of the sender and recipient can be maintained in secret. While the system and methods disclosed in the '604 patent provide convenience to those individuals who wish to keep their identities private, the '604 patent is disadvantageous in at least two respects. First, the '604 patent goes too far in trying to maintain the confidentiality and privacy of the sender and recipient. In particular, neither the sender nor recipient is required to disclose any personal information for identification purposes. Thus, if transfer information such as transaction code or personal identification number (PIN) is intercepted, the transferred funds can be easily stolen. Second, the '604 patent discloses a closed system for transferring funds, which is less convenient for the sender because the sender must locate or access the system of the '604 patent as a separate and distinct operation. Therefore, it is desirable to provide a system and method of transferring funds that is more convenient to the sender and recipient, yet provides security measures in order to prevent theft or interception of the transferred funds.

SUMMARY OF THE INVENTION

In view of the above problems associated with conventional systems and methods, the present invention provides methods and systems for transferring funds that provide convenient accessibility for the sender while also providing a high level of security on the distribution end of the transaction. Advantageously, the system and methods of the present invention may utilize an independent system or existing third party host system, such as a conventional checkout system at a hardware store or grocery store, so that the sender can transfer funds alone or in conjunction with the purchase of unrelated goods and/or services. The system includes a transfer card that is encoded with, according to one embodiment, personal information about the sender and recipient so that this information need only be entered before the first transaction and is thereafter stored permanently on the transfer card. The transfer card is readable by a device independent of part of the third party host system, such as a bar code scanner or a magnetic stripe reader. Money to be sent to the receiver is collected by the independent host system along with the money that purchases the unrelated goods and/or services. Thus, the sender is not required to seek out an ATM or stand-alone device when desiring to transfer funds, and compared to conventional systems and methods, the funds transfer of the present invention is performed more quickly and conveniently.

More specifically, a method of transferring funds according to one embodiment of the present invention comprises sending a transfer request from an independent host system to a central processing center, wherein the transfer request includes transfer information such as personal information of the sender and/or receiver as well as an amount to be transferred. The central processing center responds with a status response, which indicates whether the transfer may proceed. If the transfer proceeds, cash is preferably received by the independent host and the funds are made available for transfer to the receiver. A transaction code is generated by the central processing center and provided to the sender, who in turn communicates the code to the receiver. The receiver obtains the transferred funds by presenting transfer information and personal identification to a distribution center. The distribution center receives the transfer information and personal identification of the receiver and compares this information with the transfer information received from the sender to determine whether to distribute the funds to the receiver.

The transfer request preferably utilizes existing point-of-sale devices at the independent host system, such as a conventional checkout system employing bar code scanners and magnetic stripe (credit card) readers. In this regard, the present invention includes a transfer card having, according to one embodiment, a bar code and a magnetic stripe that includes information at least about the sender, and preferably includes information about the receiver as well. Thus, the transfer card can be used for an endless number of transfers, which speeds transactions and lowers costs.

The receiver preferably is required to present some kind of personal information to the distribution center, such as by showing a drivers license or picture identification to a teller or other personnel of a bank. The transaction code is also presented by the receiver, and the code and personal identity of the receiver are confirmed. The personal identity of the receiver and the transaction code are preferably verified by the distribution center, although verification could be performed by the central processing center.

For unbanked and banked consumers, the ability to transfer finds to people in remote locations, while shopping and purchasing items at independent retail locations, is a great advance in the art of transferring funds in terms of convenience and customer satisfaction. The systems and methods of the present invention provide more convenience to the sender by utilizing existing third party host locations and eliminating repetitive transfer forms. In addition, the systems and methods of the present invention provide security and convenience on the receiving end of the transfer, which provides more peace of mind to the sender and receiver.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
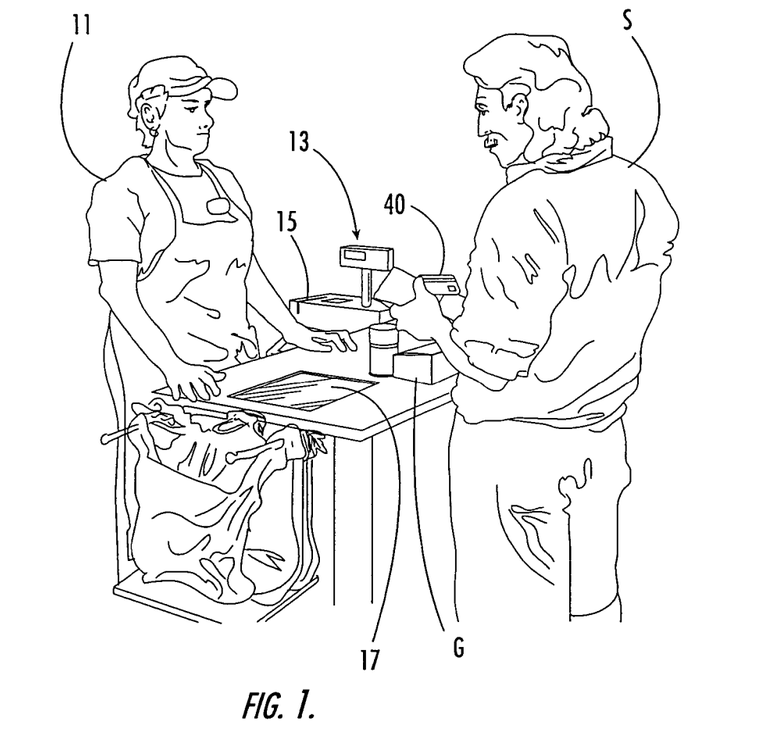
FIG. 1 is an environmental view of a funds transfer being initiated according to one embodiment of the present invention.

The present invention is directed to a system and methods for transferring funds from individual to individual. The present invention may also be directed at other systems and methods for transferring value, such as for paying bills, transferring value to a card, virtual account (e.g., a Paypal® account, cash card, or the like), or bank account. According to embodiments shown in FIGS. 1–4, the system 10 is directed toward individuals who wish to transfer funds quickly and easily by utilizing pre-existing hardware at convenient independent, third-party host locations 11. In other words, the system 10 is integrated advantageously with existing technology already present at the host locations 11. These independent host locations 11, such as retail points-of-sale like grocery stores, hardware stores, and auto parts stores, utilize several conventional methods for allowing customers to purchase goods and services in the normal course of commerce. These conventional methods include bar code readers and credit card style magnetic stripe readers, as discussed more fully below. In particular, FIG. 1 shows an example of a sender S initiating a funds transfer from host 11 according to the present invention. As shown, the sender S is in the process of purchasing unrelated goods G or services, and desires to transfer funds to an individual at a remote location. The host 11 could also be a bank or other financial institution, gas station, restaurant, or other business employing conventional checkout technology.

As stated above, the system 10 of the present invention utilizes hardware that is already available at the host location, such as existing cash registers and checkout systems, but supports proprietary stand-alone terminals and personal computers as well. Examples of other machines or devices that may be available at the host location for transferring funds include a fax machine, keypad, kiosk, automated voice response ("AVR") unit, and similar alternative communication channels. According to one embodiment, no additional hardware need be supplied to or maintained by the host 11, which greatly reduces the cost and maintenance of the system 10 and also the cost of each transaction. And if the host system 11 is connected to a network, such as the Internet or the like, the system software can be installed at the host system 11 and be updated and upgraded from a remote location, although the software alternatively may be updated and upgraded at the host system. In either case, the software that controls the conversion functions, record keeping, and other "back end" functions is preferably located at a different location than the host system 11, such as at a central processing center, as described herein.

Advantageously, the system 10 according to one embodiment of the present invention includes a transfer card 40 that enables the sender S to initiate a transfer using the independent host system 11. The transfer card 40 is associated with information at least about the sender S and, in one embodiment, also with information about a receiver R. Before the first transfer, the sender S is required to fill out a registration form, which in one embodiment is bilingual, that provides personal identifying information. In a preferred embodiment, the registration form includes personal information identifying the sender S and receiver R. The personal information is assigned to the transfer card 40, which preferably is pre-encoded with a 16-digit code, such that the personal information is associated with the code encoded on the transfer card. The card is then provided to the sender S. For example, agents, such as grocery store employees, bank tellers, or the like, can receive the form, assign the information to the transfer card, and provide the transfer card to the sender S. Alternatively, a machine, such as a kiosk or other type of automated system, could be utilized to receive information from sender S, either by sending a form or enabling a sender S to interactively enter information, such as by keypad or voice recognition, and to generate or assign a transfer card for the sender S. The transfer cards could also be preprinted and activated after the necessary information is provided to an operator. For example, the sender S could obtain a transfer card 40, but in order to use the card the sender would have to contact an administrator, such as via a toll-free number, website, etc., and provide identifying information that is to be associated with the transfer card, even if the information is not actually stored on the card, such as an identification number shown on the card as well as information about the sender S and one or more receivers R.

In one embodiment, the identifying information includes the name and address of the sender S and the receiver R, and may include other information such as telephone number, physical description, date of birth, mother and father's name, secret word, and the like. Other information may also be associated with the transfer card 40, such as a preferred distribution center (and country of the receiver R, if applicable) and identification of the account, card, or business if the receiver is not an individual. Thus, the transfer card 40 enables the funds transfer of the present invention to be somewhat "self-service" in that the involvement of the cashier or host attendant at the point-of-sale is reduced. Less attendant involvement is also less intimidating for the sender S, particularly if language or cultural barriers are present.

Figure 2:
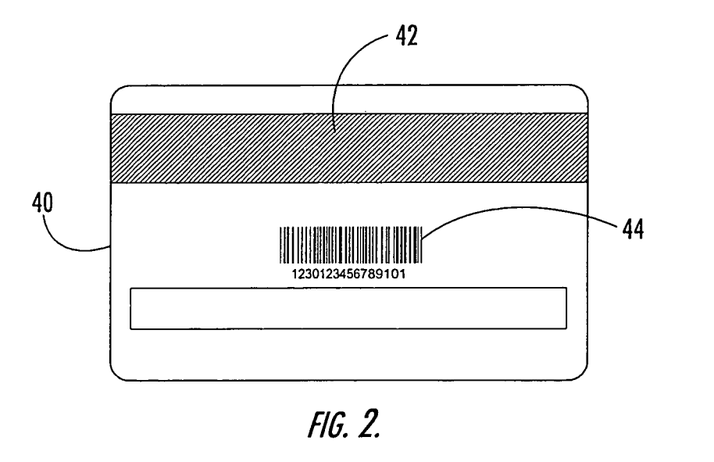
FIG. 2 is a side view of a transfer card according to one embodiment of the present invention.

Thus, while the sender S is required to initially fill out the registration form, the identifying information is thereafter assigned to the transfer card 40 such that all of this information need not be entered again for subsequent transactions. Because it is believed that most transfers are directed to a single receiver R, this feature provides an extra amount of security in determining who is able to receive the funds, while adding more convenience to the sender S by not requiring this information to be filled out each time a transaction is desired. The sender S may, however, change the name of the receiver R if the name of the receiver R is misspelled or if the sender S desires to change the name to a different receiver R. If multiple receivers are desired, it is of course possible to have multiple receivers R on the transfer card 40. It is also possible to have a separate transfer card for each receiver in order to maintain the security of each transaction. The system 10 may also be used for bill payment purposes so that the receiver R need not be an individual, but may also include companies like telephone companies or electric companies. It is also possible that the system 10 is used to prepay minutes on a telephone card, or used to transfer funds to a bank account or virtual account. As shown in FIG. 2, the transfer card 40 preferably includes a magnetic stripe 42 and a universal product code (UPC) or Code-128 bar code 44 that is readable by a point-of-sale device of the checkout system 13. For example, a magnetic stripe (credit card) reader 15 could be employed to read the magnetic stripe of the transfer card 40, and/or a bar code reader 17 could be used to read the bar code 44 of the transfer card. As mentioned above, these items are present in conventional retail points-of-sale systems, and are easily programmable to accept the transfer card 40 of the present invention. In one embodiment, transfers appear as SKU or line items on the sender's receipt along with the other purchased goods and/or services. In case the magnetic stripes 42 or bar code 44 are not readable, the 16-digit code described above is also provided on the transfer card 40 so that the transfer information can be entered manually.

Figure 3:
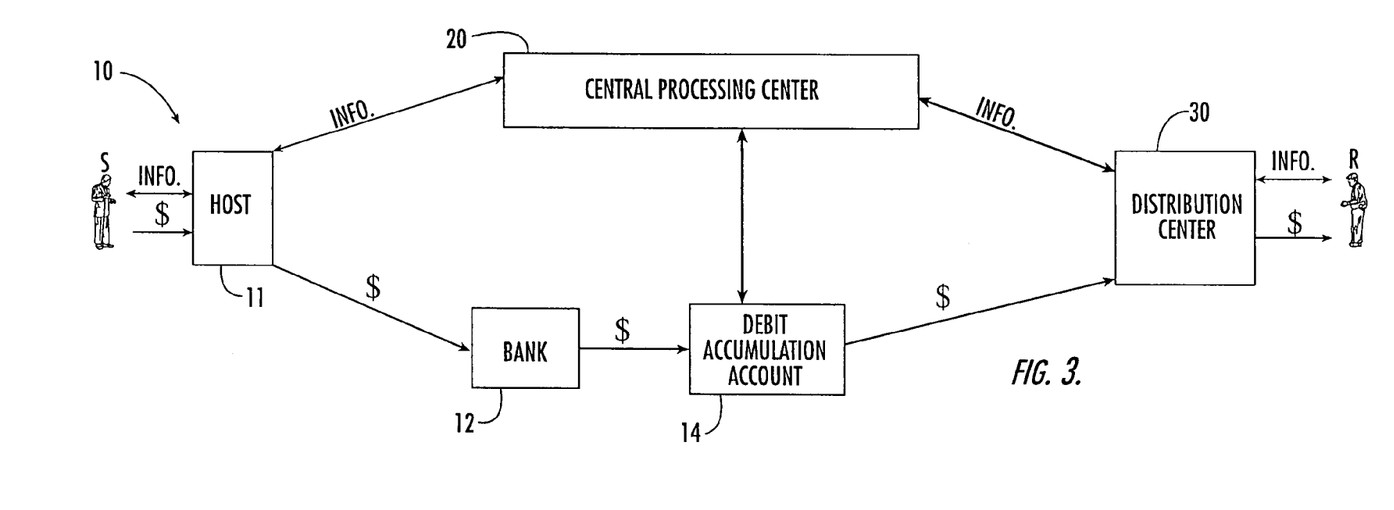
FIG. 3 is a schematic illustration of a network illustrating one embodiment of the present invention.
Figure 5:
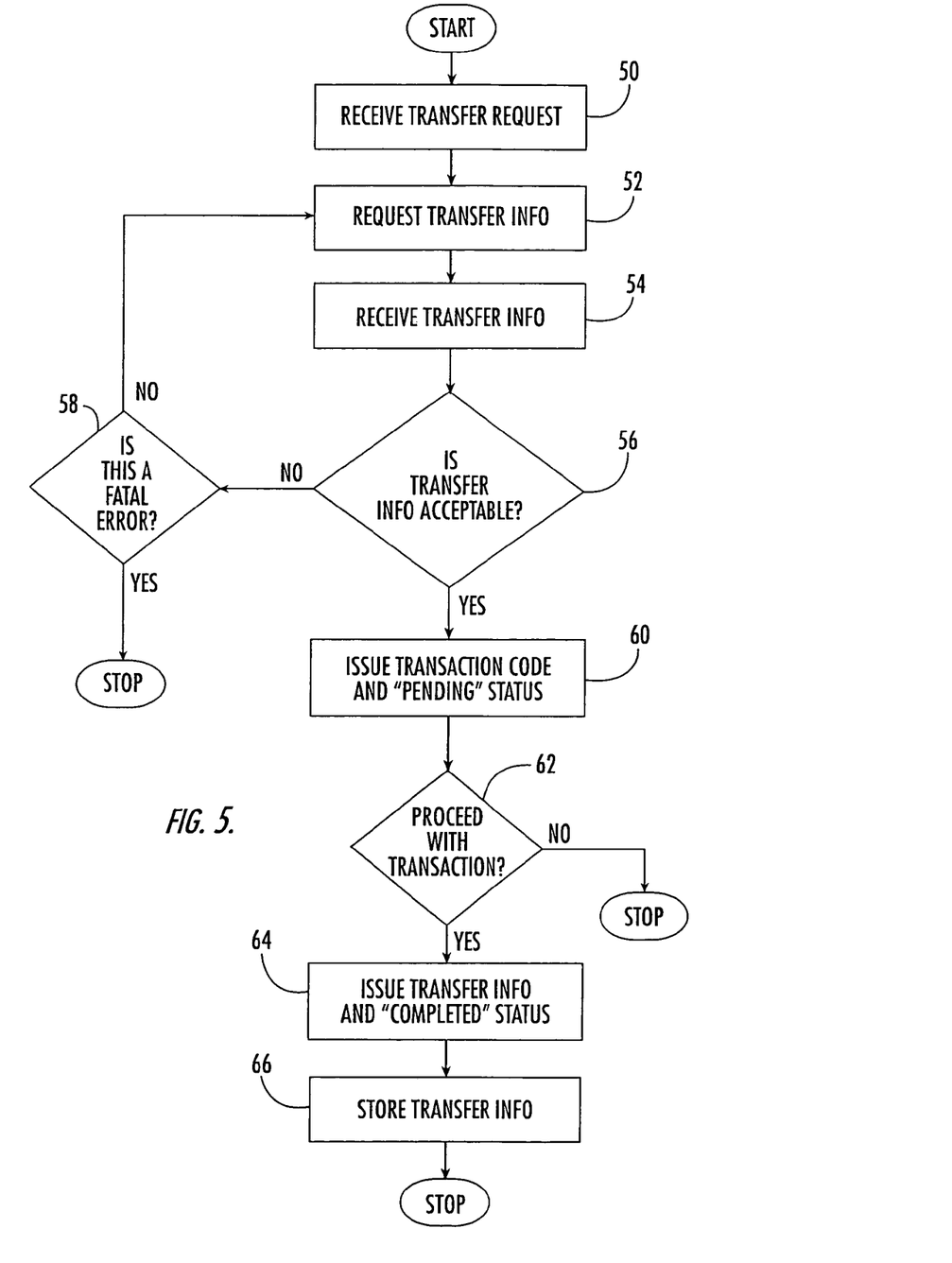
FIG. 5 is a block diagram illustrating the initiating portion of a transaction according to one embodiment of the present invention.

Turning now to FIGS. 3–6, the system 10 according to one embodiment of the present invention is shown schematically to illustrate how funds are transferred from the sender S to the receiver R. As shown in FIGS. 1, 3, and 5, the sender S initiates the transfer via the host 11 by utilizing the transfer card 40. The sender S or agent (e.g., cashier, teller, or the like) of the host 11 presents the transfer card to the appropriate card reader device, which scans or reads the card. The transfer information may also be entered manually by the sender S or the agent, such as by keypad or by voice, e.g., using an AVR unit. This is particularly advantageous if the sender S has misplaced the transfer card 40. The sender S then tells the host that the sender wishes to send a specific amount of money, e.g., five hundred dollars (US $500.00) to a single recipient. If more than one recipient is indicated, the sender S provides the transfer amount for each recipient accordingly. The host collects the specific amount of money for the transfer plus, if applicable, the money for the other purchased goods and/or a service fee. The collection of money may be by handing the money to the host or by using a machine, such as machines typically found in self-service grocery store checkouts. The host then initiates the transfer of $500 by entering this amount via a terminal manually and/or automatically and indicating that the transfer should proceed. The transfer initiation can also be accomplished by sending the transfer information via a private network or direct line, such as those used with credit card transactions. According to one embodiment, the transfer amount (plus transaction or service fee, if any) is debited from the host 11 and the transfer amount is available for transfer to the receiver R. For speed and convenience, the debiting step typically occurs sometime after the funds are made available for transfer, as discussed more fully below. In addition, a receipt (not shown) is printed for the sender S that preferably includes the transfer amount and, among other items, a toll-free number so the sender S can obtain the status of the transaction or receive other customer service. The receipt could also include advertisements, discount coupons or other information. Alternatively, a separate paper with such information could be printed out before or after the receipt for presentation to the sender S.

Such advertisements may include promotions which may be applied as discounts to future transactions. If a sender S desires to use a promotion, the sender S may contact the host system 11 to apply the promotion to a funds transfer. The host system 11 can also resolve problems related to a promotion. If the funds transfer request has not been sent to the central processing center 20, the host system 11 can resolve the problem with the promotion by applying the appropriate promotion information, such as a description of the promotion and the amount of the discount, to the funds transfer request. If the funds transfer request has already been sent to the central processing center 20, the host system 11 can cancel the funds transfer request, apply the promotion and re-send the funds transfer request.

A new transaction is initiated when the host 11 scans or reads the transfer card 40 presented by the sender S. In one embodiment, the request 50 is transferred through the host system 11 and to the central processing center 20 by sending a URL to a secure ASP of the system 10. An example of the request format is:

http://servername/asppagename.asp?/action code/account/hostID/amounttotransfer

The terms in this example are defined as follows: the server name and ASP page comprise part of a secure internet address associated with the central processing center 20. The action code is preferably 1, 2, or 3, wherein 1 represents "begin a new transaction;" 2 represents "complete the transaction;" and 3 represents "cancel the transaction." The account is a 16-digit or larger identifier associated with the sender S that is encoded on the transfer card 40 used in the transaction. The host ID is a unique identifier assigned to each host 11 associated with the system 10. The amount to transfer is preferably the principal amount to transfer in US dollars that is received from the sender S and intended for the recipient or recipients (if more than one). Once a transaction is initiated, the sender S or the distribution center 30 have the option to cancel the transaction up until the point the recipient R receives the transfer.

When the central processing center 20 receives the request from the host 11, whether via internet transfer, private line, or other communications channel, the central processing center 20 determines in steps 52, 54, 56, 58 whether the transfer may proceed based on information stored therein and if any errors are present in the transfer information. For example, the central processing center 20 may verify the host identification information and password (if provided), the transfer card information to ensure that the sender's account is active, the recipient account or information to determine if a corresponding recipient is stored in the system and whether funds can be distributed to the recipient, and whether the proposed transfer complies with applicable funds transfer laws. If the transfer information is acceptable, the central processing center replies with a comma-delimited string 60 that includes a transaction code, status code, amount to transfer in one or more currencies, and a toll-free customer service number. Other information may also be provided, such as recipient names and corresponding beneficiary number, and service charges associated with the transaction. A reply from the central processing center may also be sent via an alternative communication channel, such as by fax, or by private or shared network or line.

The initial status code sent from the central processing center 20 signifies that the transfer is "pending." To complete the transaction, the host 11 according to one embodiment contacts the central processing center in steps 62, 64 as described above, except that the action code mentioned above is set to 2. Preferably, the transfer will not be completed until a request to complete the transaction is sent from the host 11. The transfer info is then stored 66 by the central processing center 20. Funds transfers as described herein may then proceed to the steps described below. Phone cards, bill payments, and stored value cards and accounts may also proceed generally with the steps described below, but may also eliminate some of the described steps by adding value to the cards and/or accounts when the host 11 sends the request to complete the transaction.

In one embodiment, funds settlement is handled via Automated Clearing House (ACH). In particular, the cash related to the funds transfer is collected by the host 11 and transferred to a bank 12 or other financial institution, such as by conventional nightly deposits. The bank 12 includes or is connected to a debit accumulation account 14, which is also operably connected to the central processing center 20 via conventional techniques. The ACH includes a processor (not shown) that debits the transferred funds from the host's account for the transactions that have taken place during a predetermined time period and credits the debit accumulation account 14. The system 10 will also subtract any service or transaction fees, if applicable.

More specifically, the ACH processor totals the transactions for each host 11 linked to the system 10. This total preferably includes the amounts to be transferred plus service fees. For example, if Host A performs three transactions of $300, $350, and $200, and a service fee of $3 applies to each transaction, then the total debited from Host A's account will be $850+$9, or $859. The system 10 then subtracts or retains the $9 in fees and makes $850 available for transfer to the receiver R.

The system 10 may also include a distribution center 30 that is operably connected to both the central processing center 20 and the debit accumulation account 14 such that information pertaining to the funds transfer, as well as the sender S and receiver R, can be transferred to and from the host 11, the central processing center 20, and the distribution center 30 to effect the funds transfer. As mentioned above, the distribution center 30 is preferably a bank or other financial institution in order to provide a sense of security to the receiver R, as well as to maintain enough cash on hand to carry out many funds transfer transactions. The distribution center 30 can also be retail locations as well, such as pharmacies or consumer products stores. The sender S may designate a particular distribution center 30 and may subsequently change the distribution center 30 prior to the receiver R receiving the funds transfer by canceling the initial transaction and modifying the distribution center 30. The distribution center 30 is preferably located in a convenient location, such as in a convenience store, grocery store, post office, mall, and the like, and may be one of a plurality of distribution centers, each of which being capable of transferring funds to the receiver R. In addition, the distribution center 30 can be located in a remote location, including other towns, states, or countries than the other components of the system 10. Among other functions discussed in detail below, the central processing center 20 is able to determine what currency is required at the distribution end of the transfer if information about the receiver R is known. Thus, the central processing center 20 is able to convert currencies, for example from US Dollars to Mexican Pesos. This conversion, if performed, is noted on the receipt given to the sender S at the conclusion of the initiating portion of the funds transfer.

As discussed more fully below, the receiver R according to one embodiment is required to present some sort of personal identification to personnel of the distribution center, such as a picture ID, in order to receive the transferred funds. Therefore, the distribution center 30 preferably includes employees, such as bank tellers and the like, such that the personal identification of the receiver R can be verified by the personnel of the distribution center 30. Other ways are possible to verify the personal identity of the receiver R, such as fingerprint technology, retinal scanning, and the like.

Figure 4:
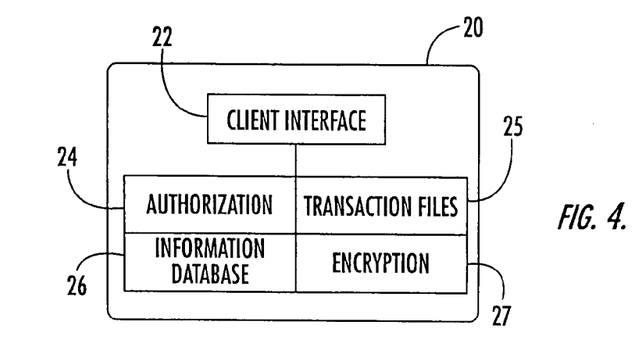
FIG. 4 is a schematic illustration of a central processing center according to one embodiment of the present invention.

FIG. 4 shows a more detailed view of the central processing center 20. In one embodiment, the central processing center 20 is a computer server and includes a client interface 22 that interacts with the host 11 and distribution center 30 to effect the funds transfer. The central processing center 20 also includes an authorization component 24, transaction files 25, an information database 26, and an encryption component 27. Other components of the central processing center 20 may also be included. The components of the central processing center 20 process and store all transactions passing there through for a complete audit trail of the transactions. For example, a "transaction" according to the present invention can be a change to the information database 26 or a transfer of funds or other types of transactions described herein. Where the distribution center 30 is a bank or financial institution, the transactions recorded and stored by the central processing center 20 can be verified by identifying parallel deposits at the distribution center.

The central processing center 20 stores the amount of money to be distributed in the transaction files 25 for later matching activity once the transfer has been completed by the distribution center. The transaction files 25 are preferably online and any particular transaction is stored therein by information including personal information regarding the seller, the transaction code and related information, the principal amount of the transfer, and personal information about the receiver R. The transaction files 25 are preferably holding files that are monitored for a length of time while waiting for the distribution process of the transaction to complete. Periodic reports may be issued to reflect those transaction files 25 that have not been distributed within a predetermined time period. The host system 11 may contact the sender S or the receiver R to verify that the distribution process of the transaction was not completed. If the distribution process of the transaction never completes or a predetermined time elapses, the convenience charge or fee, if any, is kept and the sender S and/or the receiver R is notified that the predetermined time has elapsed. In one embodiment, the amount available for transfer is returned to the sender S, such as by issuing a credit, mailing a check, or having the sender S return to the host for a refund. Rather than have the amount available returned to the sender S, the sender S may also choose to have the amount transferred to a different recipient R. If the host system 11 is not able to locate the sender S, the funds are placed in an escheat account.

Each transaction record according to one embodiment is a series of characters that provide information regarding a particular transaction. For example, a sample transaction record may be presented as follows:

1230123456789101,1–23,2335.00,Pesos,250.00,US$, 8568442D,2930398

In this example, 1230123456789101 is a 16-digit code that is pre-encoded on the transfer card 40 used in the transaction and is assigned to the sender S; 1–23 refers to the host 11 where the transfer originates; 2335.00 refers to the amount of money to be transferred to the receiver; Pesos refers to the type of currency to be transferred to the receiver; 250.00 refers to the amount of money received by the host; US$ refers to the type of currency received by the host; 8568442D refers to a confirmation number generated by the central processing center 20; and 2930398 refers to the above-mentioned transaction code generated by the central processing center that preferably is received by the distribution center 30 from the receiver R before the funds are distributed. If funds are desired to be transferred to more than one recipient, each transfer may have its own transaction record similar to the record shown above, or a new transaction record may be created that includes all the transfers to all the recipients.

The encryption component 27 provides a high level of security to data transfers between the various parts of the system 10. In particular, the data transfers in one embodiment have 128-bit encryption codes for every packet of information, and the data transfers are performed over direct dial or Internet-based Virtual Private Networks (VPN) communication links. Furthermore, the encrypted data packets contain a combination of identifiers, such as destination and origin identifiers, transmission date and time, and financial institution or banking instructions. For example, a batch record for each host 11 contains this information in a 90–100 character record that is transmitted daily to the central processing center 20 and related financial institution(s) for processing. Transaction data may also be sent at pre-established intervals from the central processing center 20 to other related institutions.

The central processing center 20 is also capable of monitoring all transactions through the system 10 pursuant to prevailing state and federal laws, rules, and regulations, including the Bank Secrecy Act and the Electronic Fund Transfer Act, as well as any revisions or additions to those laws as they occur. In order to discourage illegal activity and to maintain efficiency, the system 10 according to one embodiment include predetermined guidelines so that a sender is not permitted to transfer more than a specified amount in any single transaction, and is prohibited from making multiple transfers exceeding a predetermined maximum amount. Warning signs or "red flags" can also be established that indicate suspicious behavior. These warning signs include an extraordinary number of transfers that collectively do not meet the maximum transfer limit, or if a specific receiver receives more than the predetermined maximum amount whether from one or a plurality of senders.

Figure 6:
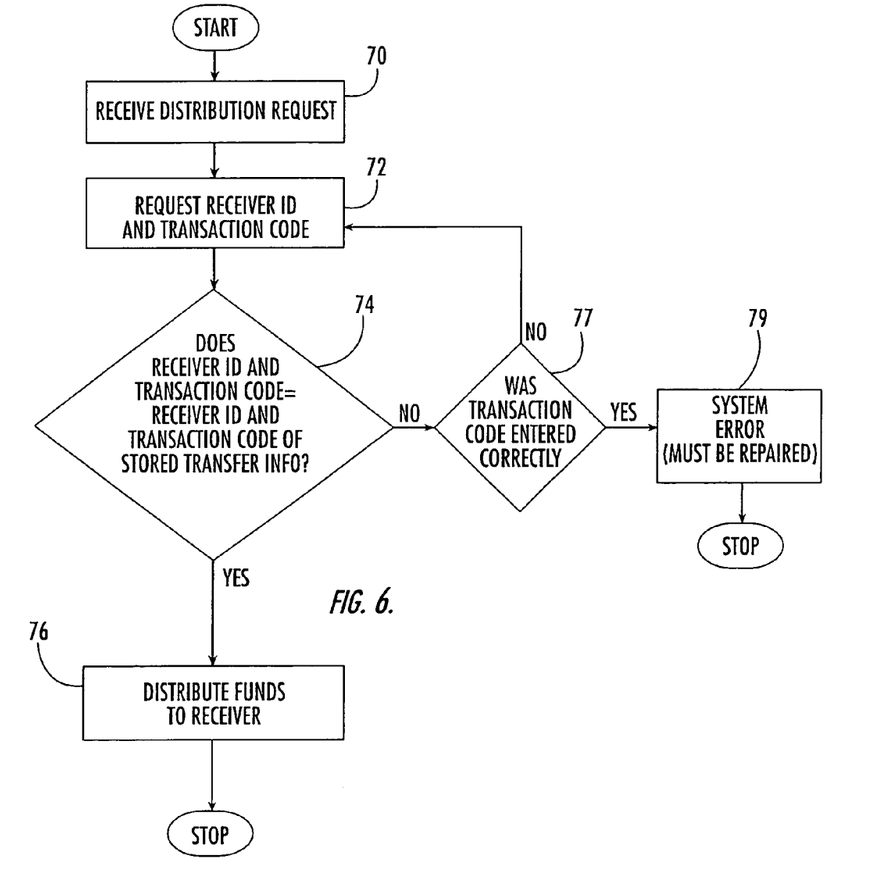
FIG. 6 is a block diagram illustrating the receiving portion of a transaction according to one embodiment of the present invention.

FIG. 6 shows a block diagram describing the distribution end of the funds transfer according to one embodiment of the present invention. In particular, a distribution request 70 is received by the distribution center 30 when the receiver R contacts the distribution center 20, which is preferably performed by the receiver entering the distribution center and requesting the transferred funds from personnel of the distribution center. As discussed above, the central processing center 20 maintains transaction files 25 bearing a list of all electronic transfer transactions that have the initiating portions completed. The information sent from the distribution center is used by the central processing center 20 to verify that the electronic transfer transaction has been completed.

Preferably, personnel of the distribution center 30 request 72 personal identification of the receiver as well as the transaction code that was issued by the central processing center 20 to the sender S. This allows the distribution of funds to be administered efficiently as there is no wait time associated with sending the information to a separate location for verification purposes. An additional advantage of this embodiment is that verification of the transaction code is not dependent on accessing telephone lines at the time the receiver R comes to collect money, as access on demand to telephone lines may be difficult in certain countries, or at certain times such as during an emergency. In this regard, the sender S can relay the transaction code to the receiver R by a variety of means, including written, spoken, or electronically. The personnel of the distribution center 30 confirms 74 the personal identification of the receiver R and the transaction code so that the risk of a fraudulent distribution of the transferred funds is minimized or eliminated. In other words, the personal identity confirmation step is performed so that a fraudulent receiver with only the transaction code cannot receive the transferred funds. It is preferred that the personnel of the distribution center 30 perform the confirmation of the receiver's personal identity in order to ensure accuracy and reduce fraud. In one embodiment, the distribution center 30 can also send the personal identification information of the receiver R and transaction code to the central processing center 20 where the central processing center verifies the personal identification information of the receiver R and the transaction code and sends an authorization signal to the distribution center to distribute the transferred funds 76 to the receiver R.

After the personnel at the distribution center 30 verify the transaction code and personal identification of the recipient R, if there is a problem completing the transfer, personnel of the distribution center 30 may obtain other information that confirms the identity of receiver R such as the telephone number of receiver R or similar information provided by sender S during registration, so that the personnel may seek to resolve the problem. Personnel at the distribution center 30 may also initiate a three-way conference call between personnel at the distribution center 30, the receiver R and the central processing center 20 in order to resolve a conflict.

Once the personal identification of the receiver R and the transaction code are verified, the distribution center distributes the transferred funds 76 to the receiver R. Completion data may also be sent to the central processing center 30, including the date and time the transaction was completed, the location where the recipient collected the funds, and the valid identification number provided by the recipient.

Because the signals indicating funds being transferred from the sender S to the receiver R happen almost instantaneously, it is clear that the physical movement of cash from the sender to the bank 12 and distribution center 30 occurs much slower. In this regard, the sender S is almost instantaneously able to transfer money to the receiver R even though the physical transfer of cash to the distribution center 30 may take several days or longer. Thus, the distribution center 30 essentially "fronts" funds to the receiver R based on the transfer information from the central processing center 20, and waits to be reimbursed from the account of the host 11.

It should be understood by those skilled in the art that the central processing center 20 of the present invention can be accessed from any number of host systems 11 having their own hardware and software for reading the transfer card 40 and transmitting information contained thereon to the central processing center 20. Therefore, the particular host system 11 used in a transaction can be at a grocery store, hardware store, or other retail location or agent that is capable of reading the transfer card 40, receiving the funds transferred from the sender S, and transmitting the transaction information to the central processing center 20 while depositing the cash received from the sender with a bank or the like. The host systems 11 can be regional or national systems or networks that can be linked in a variety of arrangements to the central processing center 20. It will also be realized by those skilled in the art that these networks or systems may be international to the location of the central processing center 20. This feature of the present invention allows a sender S to place money in the receiver's hands in a matter of moments even if the receiver or the sender is traveling or working in other countries.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the host system 11 could be an employer instead of a retail point-of-sale. This embodiment is particularly advantageous for employers who employ a large number of foreign nationals or out-of-state workers. The initiating portion of the transfer is different in that the employer makes a predetermined amount of money available for transfer on behalf of the employee sender, but the remainder of the system and transfer method remains substantially the same. Although specific terms are employed herein, they are used in a generic and descriptive sense only and not for purposes of limitation.

The invention claimed is:

1. A method of electronically transferring funds, the method comprising:
   sending a transfer request that includes transfer information associated with personal information and including an amount to be transferred from an independent host system to a central processing center;
   sending a status response from the central processing center to the independent host system;
   receiving at the central processing center distribution confirmation from a distribution center; and
   updating information maintained at the central processing center based upon said receipt confirmation;
   wherein the transfer request sending step includes transferring cash from a sender to the independent host system in conjunction with a purchase of unrelated goods and/or services.

2. The method according to claim 1, wherein the transfer request sending step includes swiping a magnetic stripe from a transfer card identifying a sender.

3. The method according to claim 1, wherein the transfer request sending step includes swiping a magnetic stripe from a transfer card identifying a sender and at least one receiver.

4. The method according to claim 1, wherein the transfer request sending step include scanning a bar code from a transfer card identifying a sender.

5. The method according to claim 1, wherein the transfer request sending step includes scanning a bar code from a transfer card identifying a sender and at least one receiver.

6. The method according to claim 1, wherein the status response sending step includes sending a pending status response and waiting for either a request for completion or a request for cancellation from the independent host system.

7. The method according to claim 1, further comprising transferring cash from a sender to the independent host system that includes an amount to be transferred to at least one receiver and a transaction fee.

8. The method according to claim 1, wherein the status response sending step includes sending a transaction code corresponding to the transfer request.

9. The method according to claim 1, further comprising printing a receipt that includes at least a transaction code and an amount to be transferred.

10. The method according to claim 1, wherein said distribution confirmation is obtained without access to the central processing center.

11. The method according to claim 1, wherein the transfer request sending step includes indicating at least one recipient that is selected from the group consisting of an individual, business, virtual account, and bank account.

12. The method according to claim 1, wherein the transfer request sending step includes indicating that the funds are to be transferred for at least one of the reasons selected from the group consisting of purchasing minutes for a prepaid telephone card, adding funds to cash card, adding funds to an online money transfer system account, paying a bill of a sender and/or a receiver, adding funds to a bank account of a sender and/or a receiver, and sending funds to an individual.

13. The method according to claim 1, wherein the transfer request sending step includes entering the transfer information via a kiosk and/or an automated voice response unit.

14. The method according to claim 1, wherein the transfer request sending step includes sending the transfer information via a private network and/or direct line.

15. A method of electronically transferring funds by way of an independent host system, the method comprising:
   sending a transfer request from a sender to the independent host system via a source that personally identifies the sender, the transfer request comprising transfer information that at least indicates a monetary amount to be received by a receiver;
   sending the transfer request from the independent host system to a central processing center;
   sending a status response from the central processing center to the independent host system that at least indicates that funds may be transferred by the sender to the receiver;
   sending from the central processing center to a distribution center personal information of the receiver and transfer information corresponding with the transfer information sent from the sender; and receiving confirmation at the central processing center that the transfer information and personal identity of the receiver were verified at the distribution center;

wherein sending of the transfer request is in conjunction with a purchase of unrelated goods and/or services.

16. The method according to claim 15, wherein the transfer request sending step includes associating the personal identification of the sender from a magnetic stripe on a transfer card.

17. The method according to claim 15, wherein the transfer request sending step includes receiving the request from the sender via a source that personally identifies the sender and the receiver.

18. The method according to claim 15, wherein the transfer request sending step includes associating the personal identification of the sender from a bar code on a transfer card.

19. The method according to claim 15, further comprising transferring cash to personnel of the independent host system in an amount that includes the cash amount to be received by the receiver and a transaction fee.

20. The method according to claim 15, wherein the status response sending step includes sending a transaction code to the independent host system that must be received from the receiver and confirmed before distributing funds from the distribution center to the receiver.

21. The method of claim 15, wherein said verification at the distribution center does not require access to the central processing center.

22. The method according to claim 15, wherein the transfer request sending step includes indicating at least one recipient that is selected from the group consisting of an individual, business, virtual account, and bank account.

23. The method according to claim 15, wherein the transfer request sending step includes indicating that the funds are to be transferred for at least one of the reasons selected from the group consisting of purchasing minutes for a prepaid telephone card, adding funds to cash card, adding funds to an online money transfer system account, paying a bill of a sender and/or a receiver, adding funds to a bank account of a sender and/or a receiver, and sending funds to an individual.

24. The method according to claim 15, wherein the transfer request sending step includes entering the transfer information via a kiosk and/or an automated voice response unit.

25. The method according to claim 15, wherein the transfer request sending step includes sending the transfer information via a private network and/or direct line.

26. An electronic funds transfer system for transferring funds from a sender to a receiver by utilizing an independent host system, the electronic funds transfer system comprising:

a transfer card that identifies the sender and is capable of being read electronically and/or manually by the independent host system in conjunction with a purchase of unrelated goods and/or services, said transfer card associated with personal information at least about the sender; and a central processing center operably connected to the independent host system and a distribution center such that transfer information from the sender can be transferred to the central processing center via the independent host system;

wherein said central processing center is designed to receive information from a distribution center including confirmation of a transfer of funds to a receiver.

27. The system according to claim 26, wherein the transfer card includes at least one device selected from the group consisting of a magnetic stripe and a bar code, the at least one device associated with the personal information at least about the sender.

28. The system according to claim 27, wherein the at least one device of the transfer card further is associated with personal information about the receiver.

29. The system according to claim 26, wherein the central processing center includes an information database for storing information at least about the sender.

30. The system according to claim 26, wherein central processing center can receive information from the distribution center comprising a financial institution.

31. The system according to claim 26, wherein the central processing center is connected to the independent host system via a private network and/or direct line.

32. A method of utilizing an existing third party point-of-sale device for transferring funds, the method comprising:

receiving transfer information that includes personal information at least about a sender, the transfer information being associated with a transfer card readable by the existing third party point-of-sale device;

transferring cash from the sender to the third party;

receiving at a central processing center the transfer information that further includes a transaction code;

receiving confirmation from a distribution center that personal identification and the transaction code from a receiver have been verified; and updating information at the central processing center based upon such confirmation wherein receiving transfer information is in conjunction with a purchase of unrelated goods and/or services.

33. The method according to claim 32, further comprising confirming the personal identification of the receiver by personnel of the distribution center.

34. The method according to claim 32, wherein the transfer information receiving step includes scanning a bar code on the transfer card by the third party point-of-sale device.

35. The method according to claim 32, wherein the transfer information receiving step includes swiping a magnetic stripe through a magnetic stripe reader of the third party point-of-sale device.

36. The method according to claim 32, further comprising printing a receipt that includes at least the transaction code and an amount to be transferred.

37. The method of claim 32, wherein said verification of the personal identification and transaction code do not require access to the central processing system.

38. The method according to claim 32, wherein the transfer information receiving step includes receiving information including at least one recipient that is selected from the group consisting of an individual, business, virtual account, and bank account.

39. The method according to claim 32, wherein the transfer information receiving step includes receiving information indicating that the funds are to be transferred for at least one of the reasons selected from the group consisting of purchasing minutes for a prepaid telephone card, adding funds to cash card, adding funds to an online money transfer system account, paying a bill of a sender and/or a receiver, adding funds to a bank account of a sender and/or a receiver, and sending funds to an individual.

40. The method according to claim 32, wherein the transfer information receiving step includes receiving information entered via a kiosk and/or an automated voice response unit.

41. The method according to claim 32, wherein the transfer information receiving step includes receiving the transfer information via a private network and/or direct line.

42. A method of electronically transferring funds, the method comprising:
   sending a transfer request that includes transfer information associated with personal information and including an amount to be transferred by a sender from an independent host system to a central processing center, wherein the transfer information identifies the sender and a receiver;
   sending a status response from the central processing center to the independent host system;
   calculating a currency exchange associated with the amount to be transferred;
   receiving transfer information and personal identification from the receiver at a distribution center;
   comparing for confirmation purposes the transfer information sent from the independent host system and the transfer information received from the receiver;
   sending an authorization from the central processing center to the distribution center to distribute cash in accordance with the transfer request; and
   distributing funds from the distribution center to the receiver;
   wherein the transfer request is sent in conjunction with a purchase of unrelated goods and/or services.

43. A method of electronically transferring funds from a sender to a receiver by way of an independent host system, the method comprising:
   sending a transfer request from the sender to the independent host system via a source that personally identifies the sender, the transfer request comprising transfer information that at least indicates a monetary amount to be received by the receiver, wherein the transfer request is sent in conjunction with a purchase of unrelated goods and/or services;
   sending a status response from a central processing center to the independent host system that at least indicates that funds may be transferred by the sender to the receiver;
   calculating a currency exchange associated with the amount to be transferred;
   receiving at a distribution center personal information of the receiver and transfer information corresponding with the transfer information sent from the sender;
   confirming the transfer information and personal identity of the receiver;
   sending an authorization indicating that the monetary amount can be received by the receiver; and
   distributing funds from the distribution center to the receiver.

44. An electronic funds transfer system for transferring funds from a sender to a receiver by utilizing an independent host system, the electronic funds transfer system comprising:
   a transfer card unique to the sender for being read electronically and/or manually by the independent host system, said transfer card associated with personal information about the sender, wherein said transfer card is being read electronically and/or manually in conjunction with a purchase of unrelated goods and/or services;
   a central processing center operably connected to the independent host system such that transfer information from the sender can be transferred to the central processing center via the independent host system; and
   a distribution center operably connected to the central processing center, said distribution center operable to receive transfer information from the central processing center and to receive personal identification and transfer information from the receiver in order to effect the transfer of funds.

45. A method of utilizing an existing third party point-of-sale device for transferring funds between a sender and a receiver, the method comprising:
   receiving transfer information that includes personal information at least about the sender and the receiver, the transfer information being associated with a transfer card readable by the existing third party point-of-sale device;
   transferring cash from the sender to the third party;
   sending transfer information from the third party to a central processing center that includes a transaction code;
   calculating a currency exchange associated with the transferred cash;
   receiving personal identification and the transaction code from the receiver by personnel of a distribution center; and
   distributing funds associated with the currency exchange from the distribution center to the receiver;
   wherein the transfer information is generated in conjunction with a purchase of unrelated goods and/or services.

46. A method of electronically transferring funds, the method comprising:
   sending a transfer request that includes transfer information associated with personal information and including an amount to be transferred from an independent host system to a central processing center;
   sending a status response from the central processing center to the independent host system;
   wherein the transfer request sending step includes transferring cash from a sender to the independent host system in conjunction with a purchase of unrelated goods and/or services.

47. A method of utilizing an existing third party point-of-sale device for transferring funds, the method comprising:
   receiving transfer information that includes personal information at least about a sender, the transfer information being associated with a transfer card readable by the existing third party point-of-sale device;
   transferring cash from the sender to the third party;
   receiving at a central processing center the transfer information that further includes a transaction code;
   receiving confirmation from a distribution center that personal identification and the transaction code from a receiver have been verified; and
   updating information at the central processing center based upon such confirmation;
   wherein the transfer information receiving step includes scanning a bar code on the transfer card by the third party point-of-sale device and wherein the bar code is scanned in conjunction with a purchase of unrelated goods and/or services.

48. A method of utilizing an existing third party point-of-sale device for transferring funds, the method comprising:

receiving transfer information that includes personal information at least about a sender, the transfer information being associated with a transfer card readable by the existing third party point-of-sale device;

transferring cash from the sender to the third party;

receiving at a central processing center the transfer information that further includes a transaction code;

receiving confirmation from a distribution center that personal identification and the transaction code from a receiver have been verified; and updating information at the central processing center based upon such confirmation;

wherein the transfer information receiving step includes swiping a magnetic stripe through a magnetic stripe reader of the third party point-of-sale device and wherein the magnetic stripe is swiped in conjunction with a purchase of unrelated goods and/or services.

* * * * *